UNITED STATES PATENT OFFICE.

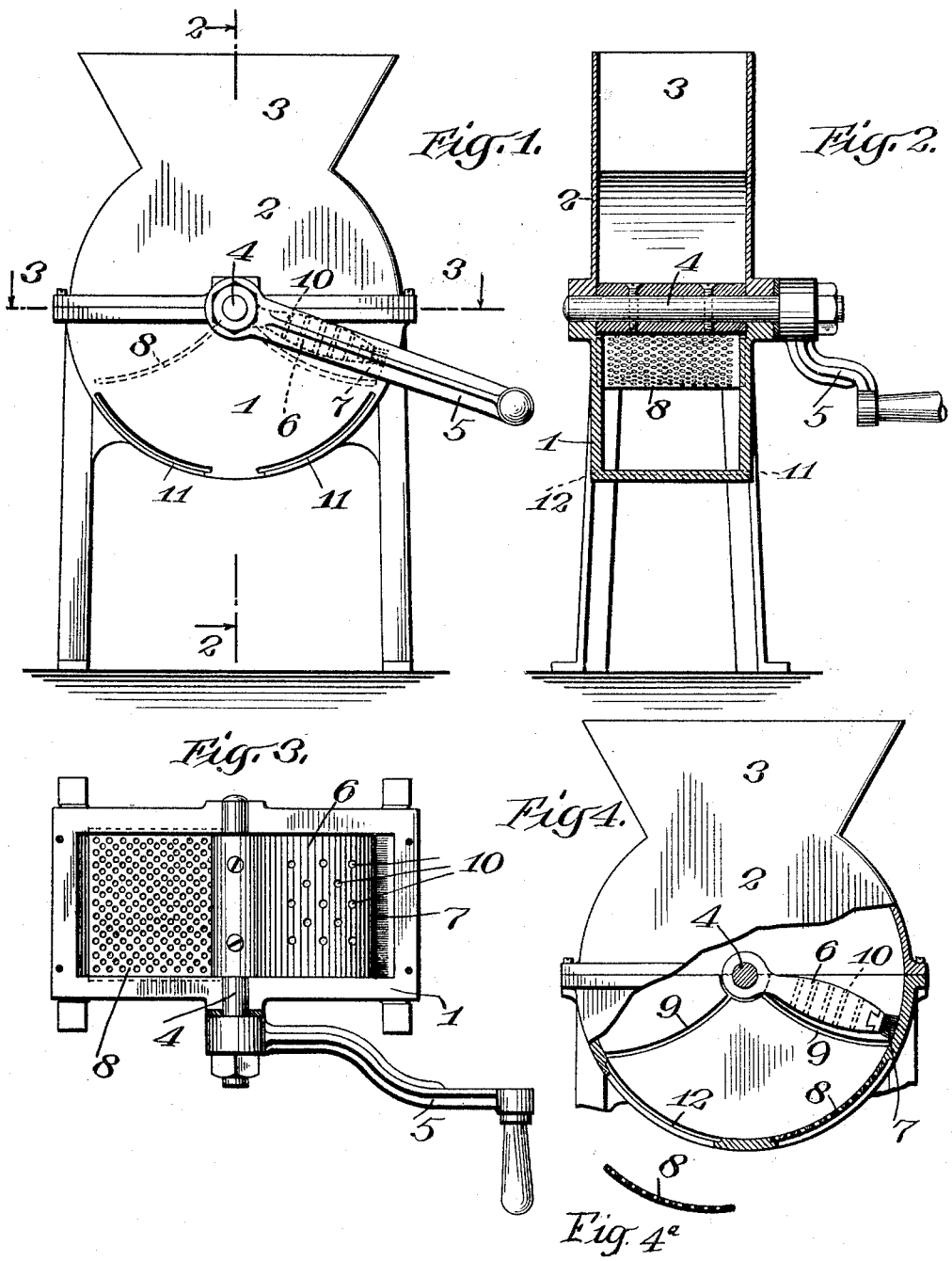

CHARLES H. J. DILG, OF NEW YORK, N. Y.

FOOD-TREATING MACHINE.

1,071,300. Specification of Letters Patent. Patented Aug. 26, 1913.

Application filed September 16, 1912. Serial No. 720,655.

*To all whom it may concern:*

Be it known that I, CHARLES H. J. DILG, a citizen of the United States, residing in the borough of the Bronx, city of New York, county of New York, and State of New York, have invented a certain new and useful Improvement in Food-Treating Machines, of which the following is a specification, reference being had therein to the accompanying drawings, forming part thereof.

My invention relates to food treating devices and particularly to devices adapted for mashing or reducing foods, such as fruits or herbaceous plants, meats, etc., to a pulp or soft mass and straining the juice therefrom.

One object of my invention is to provide a device of this class which may be readily and easily converted from a pressing into a rubbing device, and vice versa.

Another object of my invention is to provide simple and effective means for thoroughly mixing and churning the substance being treated.

Another object is to provide simple and reliable means for preventing the holes of the foraminous plate or strainer from becoming clogged.

Other objects of my invention are simplicity, durability and economy in construction, and reliability and facility in operation.

Still other objects and advantages of my invention will appear from the following description.

My invention consists of various novel features of construction and combinations of parts, as will hereinafter more fully appear.

I shall now describe the embodiment of my invention illustrated in the accompanying drawings and shall thereafter point out my invention in claims.

Figure 1 is a side elevation of a complete device embodying my invention. Fig. 2 is a vertical section of the same taken on the line 2—2 of Fig. 1, looking toward the right. Fig. 3 is a horizontal section of the same taken on the line 3—3 of Fig. 1, looking down. Fig. 4 is a view corresponding to Fig. 1, with the handle removed and with the side toward the observer partially broken away to show the interior, and showing one screen in its lower or rubbing position. Fig. 4ª is a detail in side elevation of the other screen removed.

The illustrated embodiment of my invention consists of a casing or receptacle, two removable foraminous plates or screens, a treating member or paddle, and means for operating the treating member. The casing is supported on suitable legs and is substantially cylindrical or drum shaped, and is formed of a lower substantially semi-circular half or portion 1 having an open bottom, and an upper half or portion 2 surmounted by a suitable hopper 3, shown as formed integral therewith. The two halves are secured together by bolts. A central transverse shaft 4 is removably mounted in suitable bearings in the casing and is provided on one end with a crank 5 for manual operation. To act upon the material in the casing, a treating member or paddle 6 is provided, which is secured to the shaft 4 and extends radially therefrom in a plane substantially parallel to that of the handle 5. At its outer end this paddle may be provided with some yieldable treating material 7, as bristles.

To mash, comminute or strain the contents of the receptacle, two foraminous plates or screens 8 are provided, which are substantially arcuate, shown as practically so, though multi-angular plates composed of a succession of plane portions would serve substantially the same purpose. Hereinafter I shall refer to these plates and their supporting grooves as arcuate. According to the manner in which it is desired to treat the material, means are provided in the casing of the receptacle for receiving and holding these screens in two positions, the screens being adapted to be removably held in either position. To hold the screens in the path of the paddle in position to be engaged by the faces of the paddle in its rotation, the side walls of the lower portion 1 of the casing are provided with two arcuate channels or grooves 9 extending from the center to the periphery on substantially opposite sides of the shaft 4, as shown particularly in Fig. 4, arranged so that the screens will be disposed in these grooves 9 with their concave sides upward. The screens may be inserted into these grooves 9 from the inner ends of the grooves after the shaft 4 is removed, and it is apparent that in this position of the screens the paddle 6 will approach the screens facewise and a positive pressure device is formed, by means of which the contents of the receptacle may be mashed into a pulp, and the reduced portions forced through the screens or plates 8 and the skins, seeds and other residue, if there be any, will be separated and left behind upon the screens. The faces of the paddle 6 are preferably made convex so as to conform to and fit into the concave sides of the screens, whereby pressure is exerted equally upon all parts of the screens. The paddle 6 may also be provided with perforations 10, as shown in Figs. 1, 3 and 4, so that the contents of the receptacle will be forced through these apertures and a churning action result by which the contents will be thoroughly mixed. The paddle is also preferably made to have substantially an air-tight fit with the sides of the casing, so that, as the paddle is withdrawn from the screens 8, a suction will be produced, which will prevent the holes in the screens from becoming clogged.

It will be understood that the receptacle may be charged on either side thereof at the will of the operator, the direction in which the material goes as the device is being charged being determined by the position of the paddle 6. After the paddle has passed either corner formed by the juncture of the hopper with the periphery of the upper portion of the receptacle, the contents cannot escape except through the screen on that side, and so much thereof as can be reduced to a pulp must pass through the holes in the screen. The device may, therefore, be continuously operated and the paddle reciprocated without interruption during the feeding of material into the receptacle. This is important in the case of hot vegetables, such as potatoes to be mashed, as it enables the vegetables to be rapidly operated upon, with little or no loss of heat.

When the device is to operate with a rubbing action, the screens 8 are removed from the position shown in Figs. 1, 2 and 3, and are disposed end to end substantially parallel to the arcuate path of the outer edge of the treating member or paddle 6. To hold the screens in this position, means are provided in the side walls of the bottom of the lower portion 1 of the casing comprising an arcuate slot 11 in one side wall and an arcuate channel or groove 12 in the opposite side wall, the slot and the groove being each concentric with or parallel to the arc of movement of the outer edge of the paddle 6 and being arranged so that when the screens 8 are placed therein, they complete the periphery of the receptacle and a continuous inner face or surface is thereby formed whereby the paddle may describe an uninterrupted circular movement. In this case, the bristles 7 are desirable, and as these bristles pass across the plates or screens 8, they impart a kneading or rubbing action to the contents, thereby rubbing the contents very fine and causing the soft and juicy portions thereof to pass through the screens in a soft mass.

To insert the plates or screens 8 in their lower or rubbing position as shown in Fig. 4, it is necessary only to present them edgewise to the slots 11 and to pass them through these slots until their inner edges enter the grooves 12. The curve of the arcuate screens is such that they form arcs concentric with the periphery of the receptacle and they may therefore be readily inserted in either of their two positions. It will be manifest that when disposed in their pressing position, the screens create a coarse mash; while in their rubbing position they cause the substances to be rubbed very fine before they are forced through the screens. Thus in the case of tomatoes, the fruit may be by the first operation forced through the plates 8 in the form of a coarse sauce or stew, or by the second operation may be rubbed through the screens in the consistency of a fine strained purée or jelly.

It is obvious that various modifications may be made in the construction shown and above particularly described within the principle and scope of my invention.

I claim:—

1. A food treating machine comprising a receptacle, a treating member mounted for rotation therein, an arcuate foraminous screen, means to receive and hold the screen in the receptacle in the path of the treating member in position to be engaged by the face thereof, and means to receive and hold the screen in the receptacle substantially parallel to the arcuate path of the outer edge of the treating member, the screen being adapted to be removably held in either position whereby the treating member is coöperative therewith either by a compressing or by a rubbing action.

2. A food treating machine comprising a receptacle, an arcuate foraminous screen, a paddle mounted for rotation in the receptacle and having a convex face substantially conforming to the curvature of the screen, means to receive and hold the screen in the receptacle in the path of the treating member so that the convex face of the treating member will engage and fit into the concave side of the screen, and means to receive and hold the screen in the receptacle substantially parallel to the arcuate path of the outer edge of the treating member, the screen being adapted to be removably held in either position whereby the treating member is coöperative therewith either by a compressing or by a rubbing action.

3. A food treating machine comprising a receptacle, two arcuate foraminous screens, a paddle mounted for rotation in the receptacle and having its faces curved to conform substantially to the curvature of the screens, means to receive and hold the screens in the receptacle on substantially opposite sides of the axis of rotation of the paddle in such position that one screen will be engaged by one face of the paddle and the other screen will be engaged by the other face of the paddle in different positions of rotation of the paddle, and means to receive and hold the screens end to end in the receptacle substantially parallel to the arcuate path of the outer edge of the treating member, the screens being adapted to be removably held in either position whereby the treating member is coöperative therewith either by a compressing or by a rubbing action.

4. A food treating machine comprising a receptacle, two arcuate foraminous screens, a paddle mounted for rotation in the receptacle and having its two faces convex to conform substantially to the curvature of the screens, means to receive and hold the screens in the receptacle on substantially opposite sides of the axis of rotation of the paddle in such position that one convex face of the paddle will engage and fit into the concave side of one screen and the other convex face of the paddle will engage and fit into the concave side of the other screen in different positions of rotation of the paddle, and means to receive and hold the screens end to end in the receptacle substantially parallel to the arcuate path of the outer edge of the treating member, the screens being adapted to be removably held in either position whereby the treating member is coöperative therewith either by a compressing or by a rubbing action.

5. A food treating machine comprising a receptacle, a perforated treating member mounted for rotation therein, an arcuate foraminous screen, means to receive and hold the screen in the receptacle in the path of the treating member in position to be engaged by the face thereof, and means to receive and hold the screen in the receptacle substantially parallel to the arcuate path of the outer edge of the treating member, the screen being adapted to be removably held in either position whereby the treating member is coöperative therewith either by a compressing or by a rubbing action.

6. A food treating machine comprising a receptacle, two arcuate foraminous screens, a perforated paddle mounted for rotation in the receptacle and having its two faces convex to conform substantially to the curvature of the screens, means to receive and hold the screens in the receptacle on substantially opposite sides of the axis of rotation of the paddle in such position that one convex face of the paddle will engage and fit into the concave side of one screen and the other convex face of the paddle will engage and fit into the concave side of the other screen in different positions of rotation of the paddle, and means to receive and hold the screens end to end in the receptacle substantially parallel to the arcuate path of the outer edge of the treating member, the screens being adapted to be removably held in either position whereby the treating member is coöperative therewith either by a compressing or by a rubbing action.

7. A food treating machine comprising a receptacle, a treating member mounted for rotation therein and arranged with substantially an air-tight fit with the sides of the receptacle, an arcuate foraminous screen, means to receive and hold the screen in the receptacle in the path of the treating member in position to be engaged by the face thereof, and means to receive and hold the screen in the receptacle substantially parallel to the arcuate path of the outer edge of the treating member, the screen being adapted to be removably held in either position whereby the treating member is coöperative therewith either by a compressing or by a rubbing action.

8. A food treating machine comprising a receptacle, two arcuate foraminous screens, a paddle mounted for rotation in the receptacle and having its faces curved to conform substantially to the curvature of the screens, the paddle being arranged with substantially an air-tight fit with the sides of the receptacle, means to receive and hold the screens in the receptacle on substantially opposite sides of the axis of rotation of the paddle in such position that one screen will be engaged by one face of the paddle and the other screen will be engaged by the other face of the paddle in different positions of rotation of the paddle, and means to receive and hold the screens end to end in the receptacle substantially parallel to the arcuate path of the outer edge of the treating member, the screens being adapted to be removably held in either position whereby the treating member is coöperative therewith either by a compressing or by a rubbing action.

9. A food treating machine comprising a receptacle, two arcuate foraminous screens, a perforated paddle mounted for rotation in the receptacle and having its faces curved to conform substantially to the curvature of the screens, the paddle being arranged with substantially an air-tight fit with the sides of the receptacle, means to receive and hold the screens in the receptacle on substantially opposite sides of the axis of rotation of the paddle in such position that one screen will be engaged by one face of the paddle and the other screen will be engaged by the other face of the paddle in different positions of rotation of the paddle, and means to receive and hold the screens end to end in the receptacle substantially parallel to the arcuate path of the outer edge of the treating member, the screens being adapted to be removably held in either position whereby the treating member is coöperative therewith either by a compressing or by a rubbing action.

10. A food treating machine comprising a cylindrical casing surmounted by a hopper at the top of its periphery, two screens adapted to extend from substantially the center to the periphery of the casing, a radially extending paddle mounted for rotation upon the central axis of the casing and adapted when operated to contact with the inner periphery of the casing and to engage one screen with one of the paddle faces, and to engage the other screen with the opposite paddle face, and means for operating the paddle.

11. A food treating machine comprising a cylindrical casing surmounted by a hopper at the top of its periphery, two screens adapted to extend from substantially the center to the periphery of the casing, a radially extending paddle mounted for rotation upon the central axis of the casing and adapted when operated to contact with the inner periphery of the casing and to engage one screen with one of the paddle faces and to engage the other screen with the opposite paddle face, the paddle being arranged with substantially an air-tight fit with the sides of the receptacle, and means for operating the paddle.

12. A food treating machine comprising a cylindrical casing surmounted by a hopper at the top of its periphery, two arcuate foraminous screens adapted to extend from substantially the center to the periphery of the casing, a radially extending paddle mounted for rotation upon the central axis of the casing and having its faces curved to conform substantially to the curvature of the screens, the paddle being arranged with substantially an air tight fit with the sides of the receptacle and adapted when operated to contact with the inner periphery of the casing and to engage and conform to one screen with one paddle face and to engage and conform to the other screen with the opposite paddle face, and means for operating the paddle.

In testimony whereof, I have affixed my signature in the presence of two witnesses.

CHAS. H. J. DILG.

Witnesses:
G. BAMMANN,
JOHN SCHWOERER.

Copies of this patent may be obtained for five cents each, by addressing the "Commissioner of Patents, Washington, D. C."